United States Patent [19]

Cronin et al.

[11] 3,886,301

[45] May 27, 1975

[54] PLUG-IN JOINT FOR HIGH CURRENT CONDUCTORS IN GAS-INSULATED TRANSMISSION SYSTEM

[75] Inventors: John C. Cronin, Greensburg; James C. Cron, New Stanton, both of Pa.

[73] Assignee: I-T-E Imperial Corporation, Spring House, Pa.

[22] Filed: Apr. 12, 1974

[21] Appl. No.: 460,537

[52] U.S. Cl. ................ 174/21 C; 174/13; 339/9 E
[51] Int. Cl. ... H01b 9/04; H02g 15/24; H01r 41/00
[58] Field of Search ............ 174/21 JS, 21 R, 21 C, 174/21 CA, 13, 28; 339/9 E, 64 R, 64 M

[56] References Cited
UNITED STATES PATENTS

| | | | |
|---|---|---|---|
| 2,822,418 | 2/1958 | Dinnick | 174/21 C |
| 3,032,726 | 5/1962 | Fink | 174/21 C X |
| 3,842,187 | 10/1974 | Barkan | 174/21 C |

*Primary Examiner*—Arthur T. Grimley
*Attorney, Agent, or Firm*—Ostrolenk, Faber, Gerb & Soffen

[57] ABSTRACT

A plug type connection for connecting two high current conductors in a gas-filled housing has main telescoping connectors which make sliding contacts with one another. One of the telescoping connectors is connected to one of the high current conductors to be joined to another high current conductor. The other telescoping connector is electrically connected to the other high current conductor by flexible, braided current carrying conductors, and is mechanically supported by telescoping members, one of which is mechanically connected to the said other high current conductor. A spring biases the mechanical telescoping members away from one another. When the plug-in or telescoping conductors engage, a high current connection is formed through a wiping contact arrangement. Once the current connection is made, all further mechanical changes in position of the high current conductors, due to temperature change or the like, is accommodated by the expansion and contraction of the mechanical concentric tube arrangement and in the flexing of the flexible conductors. No sliding connection exists in the telescoping connectors after the initial connection is made so that no metallic scrapings are produced and the joint can be connected remotely even though the connection cannot be visually observed.

11 Claims, 4 Drawing Figures

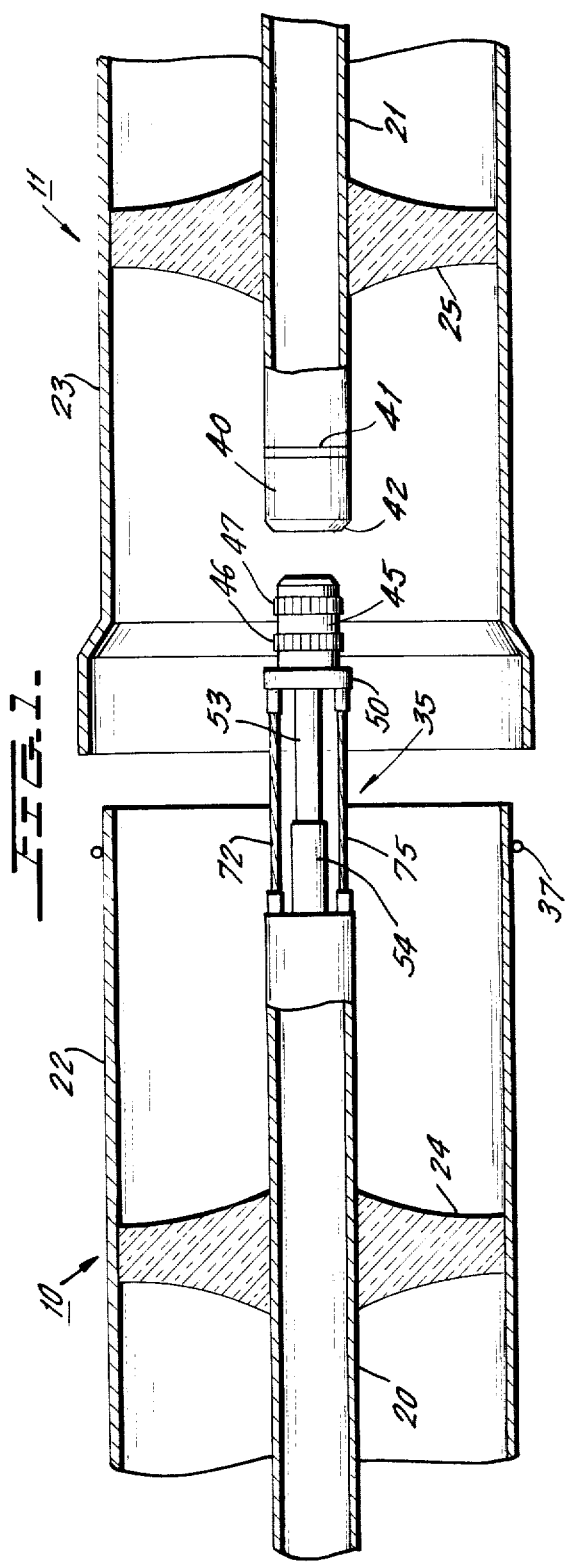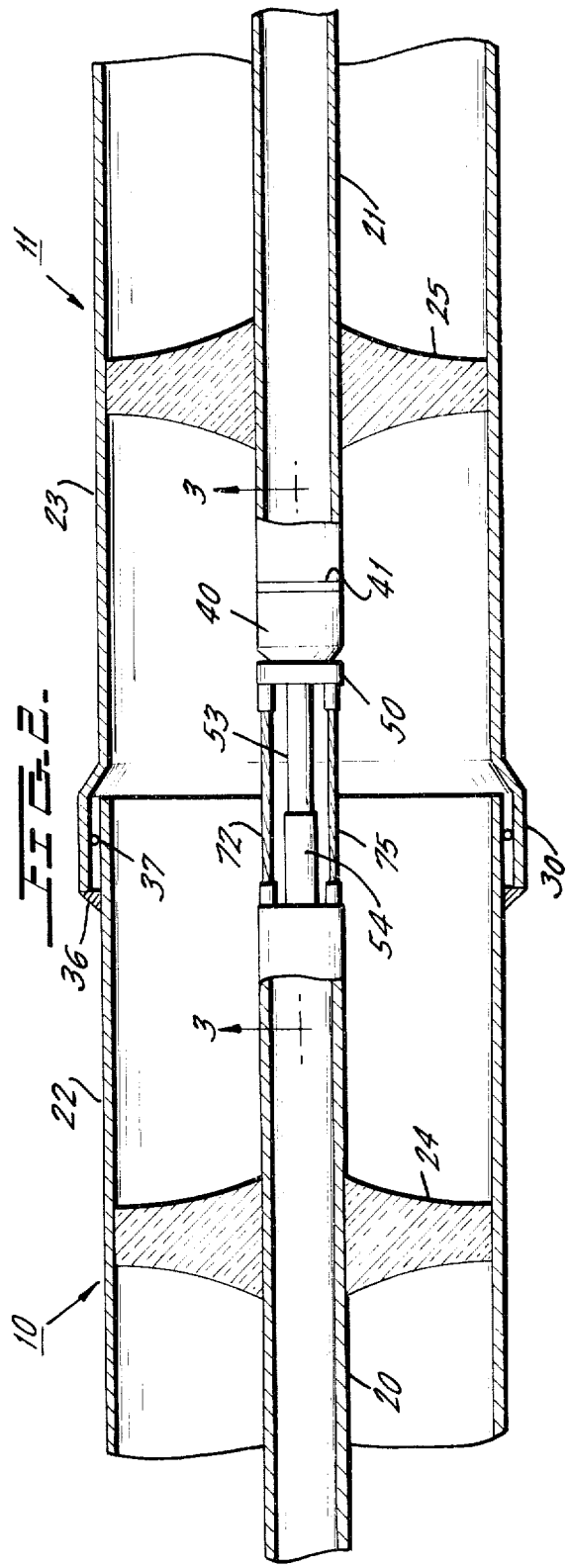

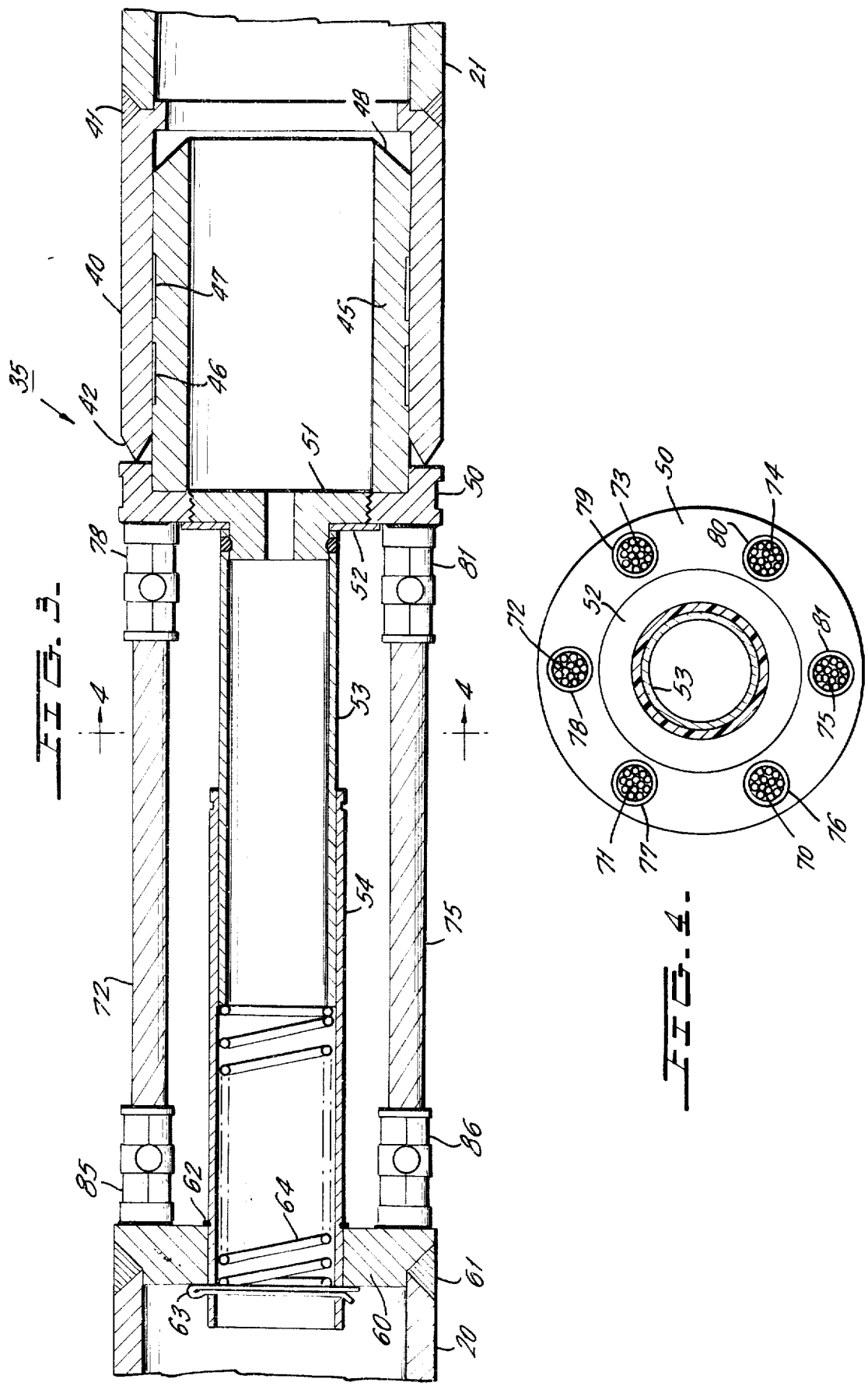

3,886,301

PLUG-IN JOINT FOR HIGH CURRENT CONDUCTORS IN GAS-INSULATED TRANSMISSION SYSTEM

BACKGROUND OF THE INVENTION

This invention relates to gas-insulated power transmission systems, and more specifically relates to a novel joint for connecting the central conductors of adjacent sections of a gas-insulated power transmission system during the installation of the system.

Gas-insulated transmission systems are well known and generally consist of a central high current conductor which is supported within a conductive grounded housing by a suitable system of insulation spacers. The interior of the housing is then filled with a suitable dielectric gas, such as sulfur hexafluoride which enables the system to be operated at extremely high voltages, for example, voltages of the order of 500 KV.

The transmission system is generally factory-assembled in given lengths of, for example, 50 feet. These separate lengths are connected to one another in the field by moving the ends of adjacent sections next to one another; making a suitable contact between the central conductors of the sections and thereafter welding the adjacent ends of the section enclosures together.

The outer enclosures are so designed that they mask the internal conductors from view and prevent access to the central conductors at the time the conductors are engaging one another. Thus, it is necessary to arrange a sliding joint for the internal conductors so that they can engage one another without the need for physical access to the joint or for observing the connection. Moreover, it is necessary that the joint is axially compressible to absorb movement due to thermal expansion and contraction of the conductors without generating metallic particles as is commonly generated by sliding electrical contacts since these particles could cause failure of the gas dielectric. In practice, the joint between the adjacent conductor ends should be capable of absorbing at least one inch of relative movement due to change in dimension of the conductors because of thermal variations for at least 15,000 cycles without an increase in the joint resistance.

At the present time, joint designs for allowing connection between the adjacent ends of the central bus of adjacent gas-insulated transmission line sections use finger type sliding contacts. However, as pointed out above, these finger type contacts can automatically produce metallic particles due to repeated sliding as the buses or central conductors compress relative to one another. Other sliding contact arrangements have also been proposed where the sliding contacts are unlikely to produce metallic particles and have very low contact resistance, but these sliding contact arrangements require very close tolerances of the various components so that the system is not mechanically feasible for the manufacture of the gas-insulated transmission system.

BRIEF DESCRIPTION OF THE PRESENT INVENTION

In accordance with the present invention, a novel plug type arrangement is provided wherein the separable elements of the plug incorporate high accuracy peripheral contact devices which produce a low resistance connection. One of these devices is then mounted on one of a pair of telescoping tubes to one of the bus members so that, as the bus member varies in position, the telescoping tubes will compress or extend without moving the cooperating joint member relative to the other joint member so that the contacts do not slide relative to one another.

A solid electric connection consisting of flexible conductors is then used to bypass telescoping tubes and to connect the bus conductor to its sliding member. This later sliding contact member is fixed coaxially with its bus conductor by the telescoping tube arrangement so that it is presented for engagement with the cooperating sliding contact member when the ends of the bus and enclosures are brought into alignment with one another. A stiff spring is provided within the telescoping arrangement to encourage the sliding engagement of the two joint members when the bus sections are forced toward one another.

After the joint has been completed, a current carrying path exists in parallel with the mechanical telescoping tubes and is formed by flexible conductors so that, as the central bus conductors expand and contract due to varying thermal conditions, the telescoping elements will vary in position and the flexible conductor in parallel with the telescoping elements will flex as necessary. Consequently, the device constructed in accordance with the invention permits an initial sliding electrical connection between the main sliding contacts, without having to observe the contacts, but prevents further sliding between these contacts after the joint is completed. Moreover, since sliding between the main telescoping contacts is now prevented after the initial contact is made, there is little danger of an increase of contact resistance.

The novel connector of the invention further allows for material misalignment between the two main bus conductors before their connection, and will roughly align the two telescoping plug members in order to ensure their engagement when the sections are brought together. The novel joint further provides relief of stress due to the bending of the enclosure. A further advantage of the novel connector is that the joint can be completed by simply pushing the conductors of two spaced sections toward one another with no outside assistance or observation being required.

As a further feature of the invention, it will be seen that portions of the conducting joint can be copper while the main elongated conductors of the transmission line are of aluminum, with novel means being provided to enable transition from copper to aluminum conductors.

BRIEF DESCRIPTION OF THE DRAWINGS

FIG. 1 is a longitudinal cross-sectional view of the adjacent ends of two gas-insulated transmission line sections which are to be brought together and to be secured to one another.

FIG. 2 is similar to the cross-sectional view of FIG. 1 and illustrates the two bus enclosures after they have been connected to one another.

FIG. 3 is an enlarged cross-sectional view taken across the section line 3—3 in FIG. 2 to illustrate the details of the novel joint of the invention.

FIG. 4 is a cross-sectional view of FIG. 3 taken across the section line 4—4 in FIG. 3.

DETAILED DESCRIPTION OF THE DRAWINGS

Referring first to FIGS. 1 and 2, there is illustrated therein typical gas-insulated transmission line sections 10 and 11 which are individually factory-assembled and each consist of central conductors or buses 20 and 21, respectively, which could be of aluminum, and which are supported within conductive grounded cylindrical enclosures 22 and 23, respectively. Suitable insulation spacers, such as insulation spacer disks 24, may be spaced along enclosure 22 to support conductor 20 centrally within the enclosure 22 and similar spacers, such as insulation spacer disk 25, support the conductor 21 within enclosure 23. While the insulators 24 and 25 have been shown as disk-type insulators, it will be understood to those skilled in the art that any insulator form, such as conical insulators or the like, could have been used. The interior of each of enclosures 22 and 23 is then filled with a suitable gas under pressure such as sulfur hexafluoride.

The enclosures 22 and 23 of FIGS. 1 and 2 are shown to be of the bell and spigot type wherein the end of bus 22 telescopes into the enlarged diameter end 30 of enclosure 23.

In order to connect adjacent sections 10 and 11 together at the site of installation, the adjacent ends of the bus are brought together from the position of FIG. 1 to the position of FIG. 2. The joint connector 35 of the invention, and which will be described in detail in connection with FIGS. 3 and 4, first allows connection between the ends of central conductors 20 and 21, which may be of aluminum, and, once the sections are in their final position shown in FIG. 2, a weld bead 36 is formed between the end of enclosure 23 and the outer surface of enclosure 22 so that a good electrical and mechanical contact and a good gas-tight seal is formed between the enclosures 22 and 23.

If desired, a contamination seal ring 37 can be formed on the outside of enclosure 22 to prevent contamination products created during the welding of bead 36 from entering the interior of enclosures 22 and 23 in the manner described in copending application Ser. No. 456,901, filed Apr. 1, 1974, in the names of J. W. Katzbeck and J. C. Cron, entitled ELASTOMERIC CONTAMINATION SEAL, and assigned to the assignee of the present invention.

The joint 35 will permit the connection between the ends of conductors 20 and 21, even though the joint is masked by enclosures 22 and 23, and is described in detail in connection with FIGS. 3 and 4.

Referring first to FIG. 3, the ends of conductors 20 and 21 are shown where the end of bus 21 is provided with one plug member 40, which may be of aluminum, of a telescoping sliding connection. The plug member 40 can be welded to conductor 21 by the weld 41. The end of plug 40 has a taper 42 to enable the plug to be self-locating with respect to its cooperating contact member 45 as will be later described.

Sliding electrical contact is made to plug 40 by the central telescoping aluminum plug member 45 which carries contact strips 46 and 47 (FIGS. 1 and 3). The interior surface of plug member 40 is silver-plated and the exterior diameter of plug member 45 is carefully formed with very close tolerance and the contacts 46 and 47 can be contact strips which make very low resistance contact to the interior surface of plug 40. Note that the end of plug 40 may be beveled at beveled region 48 to enable easy location of the plug 45 into the plug 40 as the bus members 20 and 21 are brought toward one another.

Aluminum plug member 45 is secured to an aluminum ring 50 which may be threadably carried on a stainless steel plug 51. The plug 51 then receives a spacing washer 52 and the end of an inner tube 53 which telescopes into an outer tube 54. Tubes 53 and 54 may be of any desired material such as stainless steel. The outer surface of tube 53 may be covered with a material to define a smooth outer surface, such as Teflon tape or the like, which enables easy sliding motion between tubes 53 and 54. The tube 53 is then welded to the plug 51.

An aluminum end plate 60 is welded to the end of aluminum conductor 20 by the weld bead 61. The tube 54 is then fixed to the ring 60 by the retainer ring 62 and cotter pin 63. Pin 63 also serves as a seat for compression spring 64 which presses against the left-hand end of tube 53 and tends to separate telescoping tubes 53 and 54.

A flexible electrical connection is then made between the end plate 60 and the ring 50 and includes the braided copper conductors 70 to 75 (FIGS. 3 and 4).

The braided conductors 70 to 75 are preferably of copper. If the other conductors of the system, including rings 50 and 60, are of copper, the braided conductors 70 to 75 can be directly secured to rings 50 and 60 by brazing, or the like. However, if rings 50 and 60 are aluminum, the common precautions in securing aluminum conductors to copper conductors should be exercised. Thus, the braided conductors 70 to 75 may be provided with copper ferrules at one of their ends, such as ferrules 76 to 81 for flexible conductors 70 to 75, respectively, and aluminum crimp connectors at their opposite ends, shown as aluminum crimp connectors 85 and 86 for conductors 72 and 75, respectively, in FIG. 3. The aluminum ring 50 may then have protruding studs which receive connectors 76 to 81, respectively, by crimping and brazing or the like. The ring 60 may also have protruding studs which are connected to aluminum crimp connectors 85 and 86. If desired, further brazing or spot welding can also be used to ensure the connection between the ferrules, such as ferrules 85 and 86 to their respective studs.

The operation of the novel joint of the invention can now be understood. In order to make a connection, the enclosures are moved from the position of FIG. 1 to the position of FIG. 2. This causes the plug type member 45 to enter the plug type member 40, even though the buses were not absolutely aligned prior to their connection. The telescoping tubes 53 and 54 serve to mechanically position the plug member 45 generally along the axis of bus 20 and plug member 45 is electrically connected to bus 20 through the cable connectors including cables 72 and 75. As the conductors 20 and 21 move toward one another, the plug member 45 enters plug 40 and sliding contacts 46 and 47 make good low resistance contact to the interior surface of plug member 40. Once the end of plug member 40 engages ring 50, as shown in FIG. 3, full contact is made and continued movement of bus 20 toward bus 21 will simply cause telescoping members 53 and 54 to enter one another more completely and will cause the flexing of the flexible conductors, such as conductors 72 and 75. Preferably, if the plugs 40 and 45 are fully connected in the position of FIG. 3, the bus 20 should continue to be moved toward bus 21 for at least one inch to ensure loose play in the flexible conductors, such as conductors 72 and 75 before the enclosures 22 and 23 are in position to be welded together. These are dimensions that can be easily obtained by appropriately fixing the positions of the ends of conductors 20 and 21 relative to the ends of their respective outer housings 22 and 23.

Once the bus is so connected and the housings welded, all changes in the position of conductors 20 and 21, due to thermal expansion or contraction, will be taken up by the relative movement of telescoping members 53 and 54 and the extension or bending of the flexible cables, such as cables 72 and 75 of FIG. 3. There will, however, be no sliding action between plug members 40 and 45 and these members will remain fixed in place relative to one another to ensure a low resistance joint to prevent the formation of metallic particles due to a sliding contact.

Although there has been described a preferred embodiment of this invention, many variations and modifications will now be apparent to those skilled in the art. Therefore, this invention is to be limited, not by the specific disclosure herein, but only by the appended claims.

The embodiments of the invention in which an exclusive privilege or property is claimed are defined as follows:

1. A sliding connection joint for connecting adjacent sections of a gas-insulated transmission line; each of said sections of said gas-insulated transmission line comprising a central conductor, a grounded outer housing extending coextensively with said central conductor, insulator means supporting said central conductor within its said grounded outer housing, and a dielectric gas under pressure sealed within said grounded housing; said adjacent sections being aligned end to end with their said central conductors connected to one another and with their said outer housings connected to one another; said connection joint comprising a first cylindrical conductive sleeve mechanically and electrically secured directly to one end of a first conductor of one of said adjacent sections and a second cylindrical conductive sleeve electrically connected to an end of a second conductor of one of said adjacent sections which is adjacent said end of said first conductor; said first and second cylindrical conductive sleeves being telescoped relative to one another and being in contact with one another over at least one annular contact area between their adjacent cylindrical surfaces; flexible mechanical support means connected between said end of said second conductor and said second conductive sleeve for normally physically supporting said second conductive sleeve coaxially with said second conductor and for biasing said second sleeve away from the end of said second conductor; and flexible conductor means electrically connected between said second conductive sleeve and said second conductor, whereby, when said outer housings of said adjacent sections are brought toward one another, said second sleeve is physically presented for sliding, telescoping contact relative to said first sleeve, thereby to electrically connect said first and second conductors, while thermally induced relative movement between said first and second conductors is absorbed by movement of said flexible mechanical support means and said flexible conductor means without sliding motion between said first and second conductive sleeves.

2. The connection joint of claim 1 wherein said flexible mechanical support means comprises first and second telescoping tubes slidable relative to one another and mechanically connected to said end of said second conductor, and to said second sleeve, respectively.

3. The connection joint of claim 2 wherein said flexible conductor means comprises at least one braided conductor extending parallel to and exteriorly of said first and second telescoping tubes.

4. A connection joint for enabling the plug-in connection between the first end of a first conductor and the second end of a second conductor which is coaxial with said first conductor while preventing sliding at said plug-in connection, after the connection is made; said connection joint comprising a first cylindrical conductive sleeve mechanically and electrically secured directly to said first end of said first conductor, and a second cylindrical conductive sleeve electrically connected to said second end of said second conductor; flexible mechanical support means connected between said second end and said second conductive sleeve for normally physically supporting said second conductive sleeve coaxially with said first and second conductors, and for biasing said second sleeve away from said second end; and flexible conductor means electrically connected between said second conductive sleeve and said second end; said first and second cylindrical conductive sleeves having dimensions which would allow them to telescope relative to one another while making low resistance electrical contact between their adjacent inner and outer surfaces when they are fully telescoped into one another.

5. The connection joint of claim 4 wherein said flexible mechanical support means comprises first and second telescoping tubes slidable relative to one another and mechanically connected to said end of said second conductor, and to said second sleeve, respectively.

6. The connection joint of claim 5 wherein said flexible conductor means comprises at least one braided conductor extending parallel to and exteriorly of said first and second telescoping tubes.

7. A connection joint construction for a length of a gas-insulated transmission line; said length of gas-insulated transmission line comprising an elongated outer housing filled with a dielectric gas under pressure, and an elongated conductor insulatingly suspended within said outer housing; said elongated conductor having first and second ends; said connection joint construction comprising a first cylindrical conductive sleeve mechanically and electrically secured directly to said first end of said first conductor, and a second cylindrical conductive sleeve electrically connected to said second end of said second conductor; flexible mechanical support means connected between said second end and said second conductive sleeve for normally physically supporting said second conductive sleeve coaxially with said conductor, and for biasing said second sleeve away from said second end; and flexible conductor means electrically connected between said second conductive sleeve and said second end; said first and second cylindrical conductive sleeves having dimensions which would allow them to telescope relative to one another while making low resistance electrical contact between their adjacent inner and outer surfaces when they are fully telescoped into one another.

8. The sliding connection joint of claim 1 wherein said first and second sleeves have beveled ends opposing one another to guide said sleeves into telescoping engagement with one another as said sleeves are moved toward one another.

9. The sliding connection joint of claim 4 wherein said first and second sleeves have beveled ends opposing one another to guide said sleeves into telescoping engagement with one another as said sleeves are moved toward one another.

10. The sliding connection joint of claim 1 wherein the interiormost telescoping sleeve of said first and second conductive sleeves has low resistance contact means formed around the outer surface thereof for making low resistance contact to the interior surface of the outermost of said first and second conductive sleeves.

11. The sliding connection joint of claim 4 wherein the interiormost telescoping sleeve of said first and second conductive sleeves has low resistance contact means formed around the outer surface thereof for making low resistance contact to the interior surface of the outermost of said first and second conductive sleeves.

* * * * *